Oct. 11, 1960 O. DOHLER ET AL 2,956,204

ULTRA-HIGH FREQUENCY TUBES

Filed April 11, 1956 6 Sheets-Sheet 1

Oct. 11, 1960 O. DOHLER ET AL 2,956,204

ULTRA-HIGH FREQUENCY TUBES

Filed April 11, 1956 6 Sheets-Sheet 3

United States Patent Office 2,956,204

Patented Oct. 11, 1960

2,956,204

ULTRA-HIGH FREQUENCY TUBES

Oskar Dohler and Jean Paul Nalot, Paris, France, assignors to Compagnie Generale de Telegraphie Sans Fil, a corporation of France Filed Apr. 11, 1956, Ser. No. 577,598

Claims priority, application France Apr. 14, 1955

17 Claims. (Cl. 315—39.3)

The present invention relates to a new type of ultra-high frequency oscillator tube, which combines the respective advantages of the magnetron and of the backward wave oscillator, without displaying the drawbacks, which on certain occasions these tubes may present.

It is known that magnetrons have a comparatively high efficiency, and a high output, and that they are of rather simple construction. However, they are tunable within only a very narrow band, namely a band of the order of at most a few percent of the medium operating frequency, and they are not electrically tunable. Magnetron tuning is achieved through the medium of mechanical devices, which are costly and technologically involved.

The backward wave oscillator was first described in the co-pending patent application, Serial Number 281,347, filed April 9, 1952, in the name of Bernard Epsztein. This tube is characterized by a delay circuit and an interaction duct or space, both with mutually uncoupled ends, the end of the delay circuit adjacent to an emissive cathode being coupled to an output connection and the opposite end being provided with an attenuation. The tube operates on the principle of interaction between an electron beam and a backward space harmonic of the wave propagating in the delay circuit. This oscillator can be tuned electronically over a wide range of frequencies. However, its structure is comparatively complex and, unless the tube presents a rather long interaction space, not all of the energy of the beam is transferred to the delay line.

It appears accordingly that a need exists for a tube having intermediate characteristics between those of the magnetron and those of the backward wave oscillator of the above patent application, namely an electrically tunable oscillator of simple and rugged structure, having a tuning band which, while not being as broad as the tuning band of the above backward wave oscillator, is still substantially broader than the tuning band of the magnetron.

The tube according to the invention comprises, within an evacuated envelope, a cylindrical anode and a cylindrically shaped, axial, negative electrode or cathode surrounded by the anode, the diameter of which is an appreciable fraction of that of the anode of the tube and which is provided, at least over a portion of its surface, with an emissive coating.

The anode is built up by a delay circuit portion which is coaxial with the negative electrode and surrounds the latter over the major part of its periphery. A first end of this delay line portion is connected to the output while the other end is coupled to an absorber, which may be outside or inside the tube. In this latter case the two ends of this delay line portion may be interconnected by the absorber. According to a particular embodiment the delay line may surround entirely the central electrode or cathode. Actually, in this case, the above delay line portion which may be termed the active delay line portion has its two ends connected by an inactive delay line portion which is coated with an absorbing substance or, more generally, has an absorbing substance provided in the electromagnetic field thereof, which amounts to the same.

Thus, it may be seen that a characteristic feature of the new tube according to the invention is that the two ends of the delay line are uncoupled insofar as the wave energy propagated in the line is concerned, i.e. in that there is discontinuity in wave propagation between the two ends of the line or of the active delay line portion, while these ends are coupled insofar as the electron beam is concerned. The uncoupling of the two ends of the delay line may result either from a physical discontinuity or gap between these two ends, or from the interposition between these ends of an absorbing substance which may be supported by a delay line portion or more generally be positioned in the electromagnetic field of this portion of the line, or from a short circuit provided on that delay element of the delay line which is nearest to the tube output, when the absorber is outside the envelope of the tube and when there is no discontinuity between the two ends of the active portion of the delay line. In any case the gap, if any, between the two ends of the delay line must be sufficiently small for the static electric field not to be disturbed. If for any reason this gap is larger, it must be closed by a metal element. If this element contacts the ends of the delay line it must be connected to the envelope of the tube by a short circuit and/or attenuated.

According to another feature of the invention, a short-circuit is advantageously established on the element of the attenuated zone of the delay line which is nearest to the output, whatever the method used for uncoupling the two ends of the line may be.

According to yet another feature of the invention, the attenuated portion is insulated from the remainder of the delay circuit and subjected to an adjustable potential, independent from the anodic voltage.

It is known that, when an electron beam propagates along a delay line, the electrons are successively subjected to the action of the field of the delay elements along which they propagate. The resulting action is appreciable only if these successive actions are substantially in phase, i.e. if the beam velocity is equal in magnitude and direction to the phase velocity of one of the waves, or space harmonics, induced in the delay line by the interaction of the latter with the beam. This condition of substantial synchronism being met, the field of the line density modulates the beam and, conversely, the density modulated beam interacts with the field of the line. This results in an energy flow along the line. It is also known, from the aforementioned copending patent application, that synchronism with a backward wave component which is achieved by regulating the beam velocity gives rise to continuous oscillations. It is further known that any energy reflected from the output of the tube, due to any possible mismatch between the tube and the load connected thereto, is absorbed by the absorber provided in the tube.

The invention will be better understood from the following description taken with reference to the appended drawing, in which.

Figure 2:
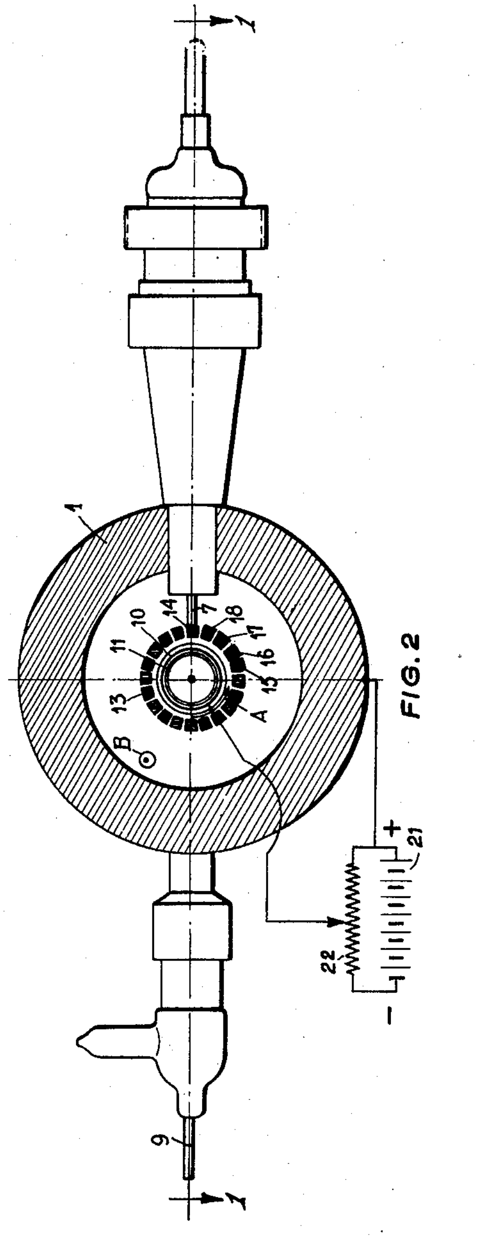
Fig. 2 is a cross-section of Fig. 1, through a plane taken along line 2—2 of Fig. 1.
Figure 9:
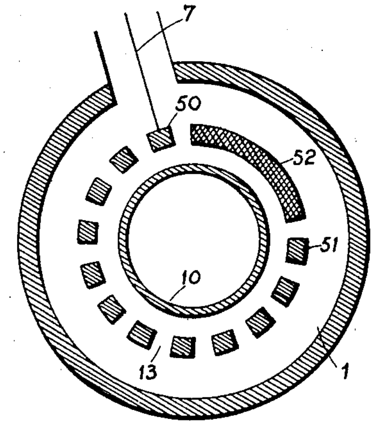
Figure 10:
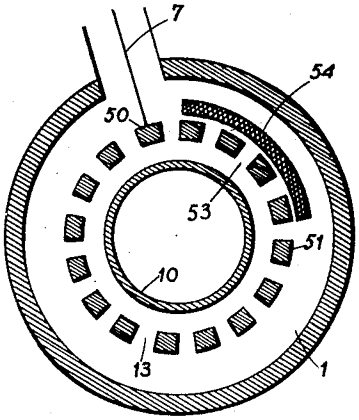
Figures 5, 11, 12:
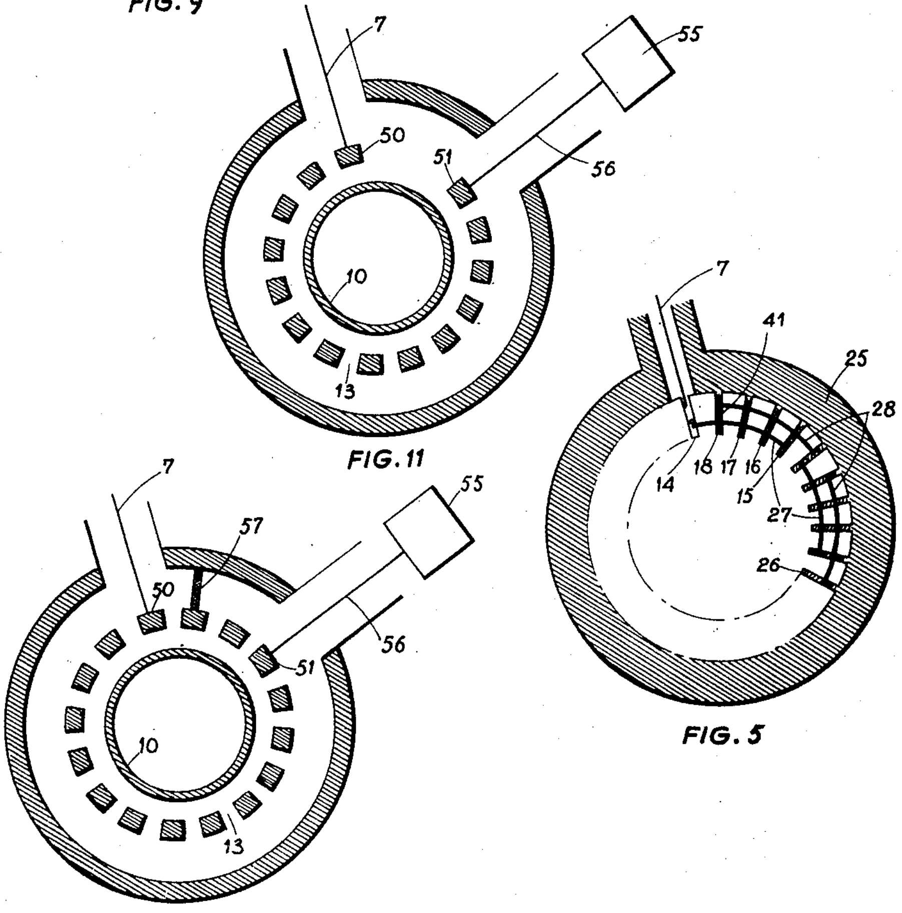
Figure 13:
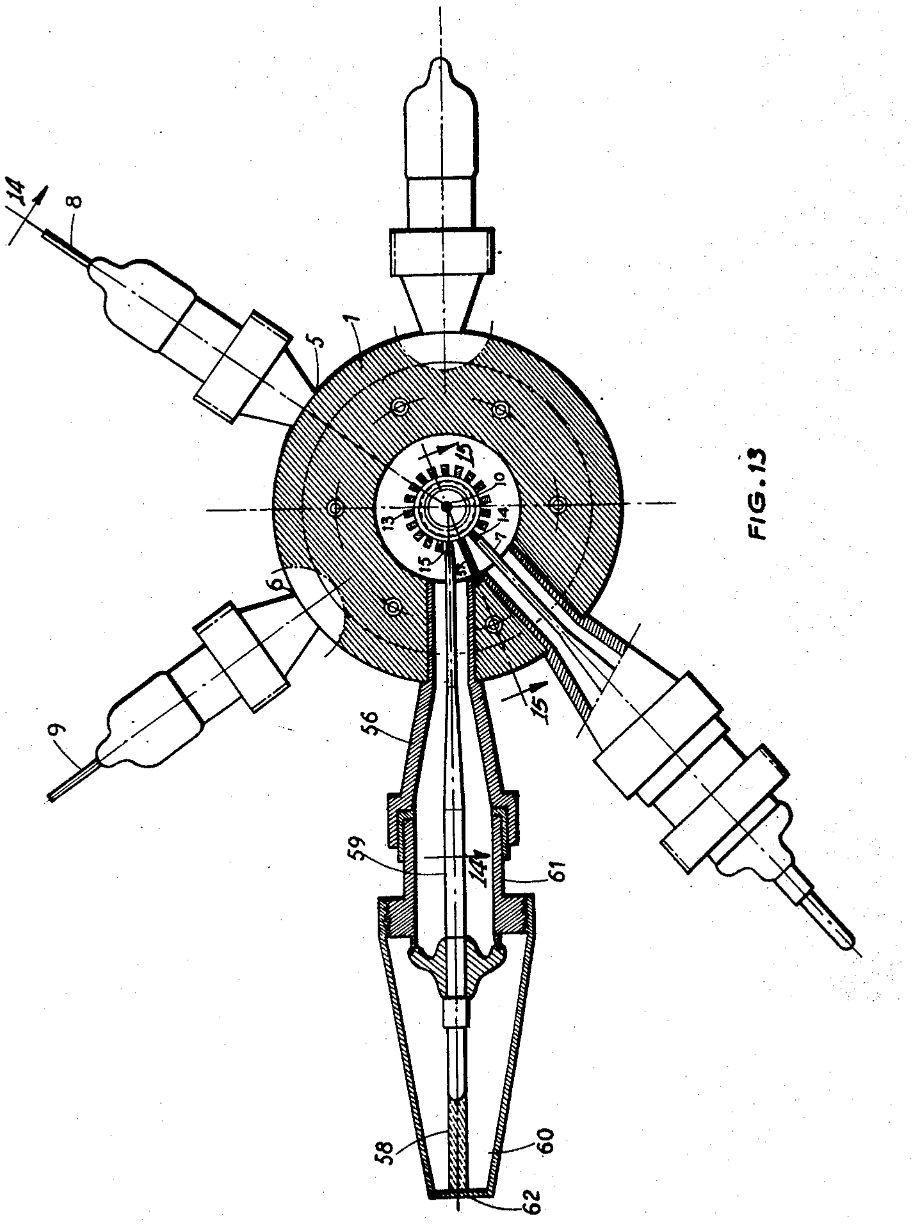
Figures 14, 15:
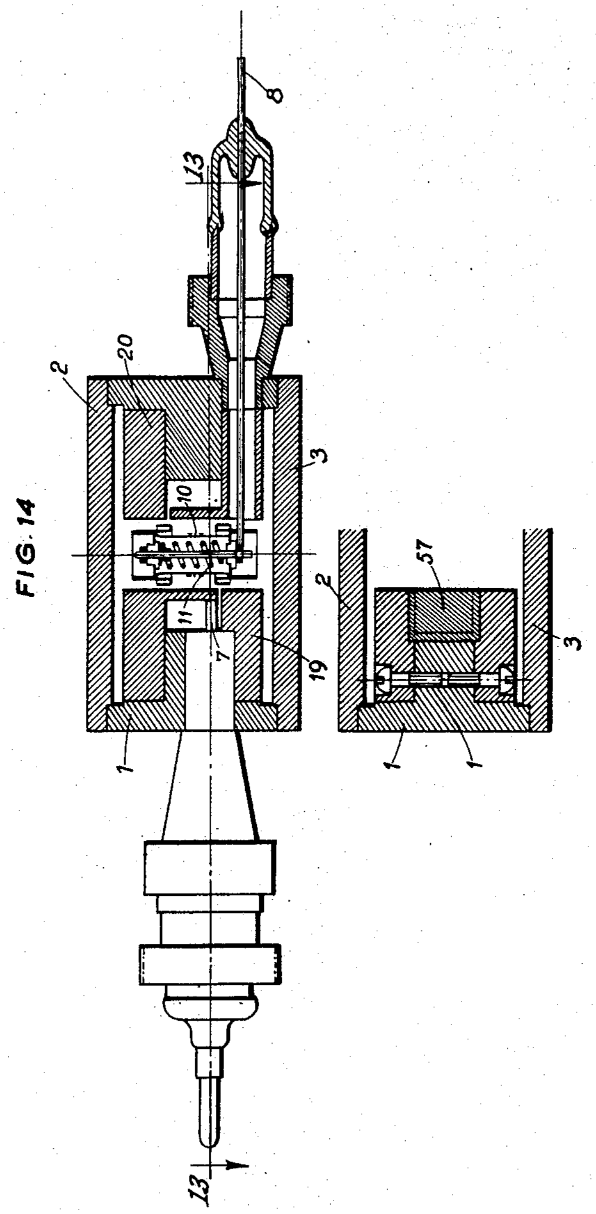

Fig. 9 very diagrammatically shows a cross-sectional view similar to Fig. 2 of an embodiment of the tube according to the invention in which the two ends of the delay line are separated by an absorber;

Fig. 10 is a figure similar to Fig. 9 in which the delay line is continuous and an absorber is provided in the electromagnetic field thereof;

Fig. 11 is a figure similar to Fig. 9 in which the absorber is located outside the tube;

Fig. 12 shows an embodiment similar to that of Fig. 11 further comprising a short-circuit on the delay element adjacent the output;

Fig. 13 shows a plane view, partially in cross section taken along the line 13—13 of Fig. 14 and in more detail, the tube of Fig. 12;

Fig. 14 shows the same tube as Fig. 13 in side view partially in cross-section taken along the line 14—14 of Fig. 13; and Fig. 15 shows a detail of the tube of Figs. 13 and 14, in section along the line 15—15 of Fig. 13.

The same reference numerals designate corresponding elements throughout the various views of the drawings.

Figure 1:
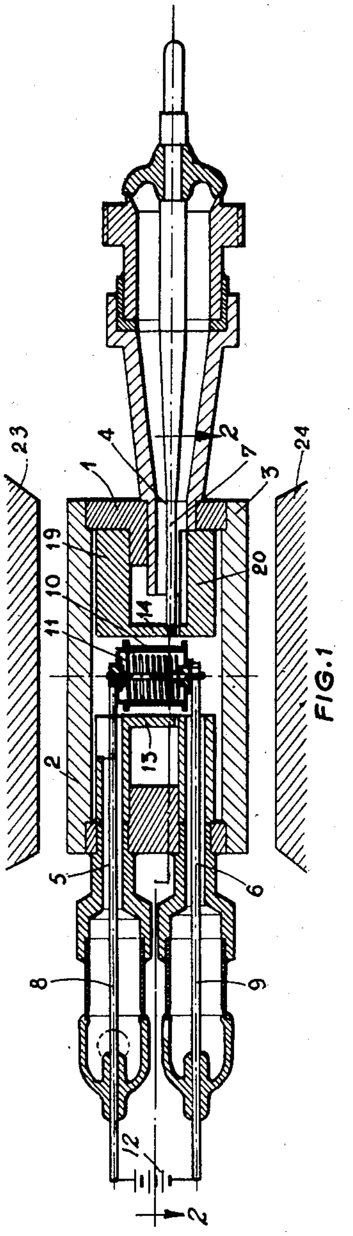
Fig. 1 is an axial section through the tube according to the invention, this section being taken along line 1—1 of Fig. 2.

Referring to the embodiment shown in Figs. 1 and 2, the tube comprises a cylindrical metal envelope 1 and two side flanges 2 and 3 enclosing the cylindrical envelope on both sides thereof. Openings 4, 5, and 6 are provided in cylinder 1 for receiving, respectively, a coaxial output conductor 7 and conductors 8 and 9 for indirectly heating a cathode 10. Cathode 10 is a large, hollow, cylindrical electrode coaxial with envelope 1 of the tube, and surrounds a heating filament, such as a helix 11, the two ends of which are respectively connected to conductors 8 and 9. A source 12 supplies the heating energy. A cylindrical delay circuit 13 is located coaxially with cathode 10, which it surrounds completely in the embodiment considered. An element 14 of the delay line is coupled to the output conductor 7 and elements 15, 16, 17, 18 of which the element 18 is located adjacent to the element 14, are coated with an absorbing substance.

As shown in Figs. 1 and 2, the delay circuit 13 is an interdigital delay line, and each comb 19 and 20 thereof comprises ten fingers. An anode voltage which is adjustable by means of a potentiometer 22 is applied between the envelope 1 and cathode 10, by means of a source 21 the delay line 13 being in contact with the tube envelope. A permanent magnet, or an electro-magnet, the poles of which are designated by reference numerals 23 and 24 in Fig. 1, provides a magnetic field B (Fig. 2) parallel to the axis of the tube.

The device according to the invention operates as follows:

Cathode 10, when sufficiently heated by the helically shaped filament 11, emits electrons over the entirety of its surface, as in an ordinary magnetron. Assuming that the lines of force of the magnetic field B are directed, from back to front, perpendicularly to the plane of Fig. 2, i.e., perpendicularly into the plane of the drawing of Figure 2, then the electrons move, in the interaction space bounded by cathode 10 and delay line 13, in the direction of the arrow A in Fig. 2, entering the attenuated zone in front of finger 15 and leaving it behind finger 18.

It appears that the cloud of electrons to which there is imparted, under the action of the axial magnetic field and of the radial electric field resulting from the potential difference existing between the delay line and the cathode, a circular movement around the cathode, may be considered as a beam, similar to the electron beam of conventional traveling wave tubes.

As already indicated above, the propagation of the beam along the delay line results in interaction of this beam with the field induced in the line and generation of energy at the output 7 of the tube.

In order to increase the interaction, use should be made of a delay line having high amplitude reverse space harmonics, for example an inter-digital line.

The ultra-high frequency energy supplied by the tube is collected by coaxial conductor 7. The existence of the attenuation 15—18 on a portion of the delay line prevents the production of reflected waves and, consequently, the establishment of standing waves, by absorbing any energy propagating in the same direction as the beam.

Accordingly it may be noted that, while in a conventional magnetron the oscillations result from the establishment of a system of standing waves, in the tube according to the invention, only traveling wave energy exists.

Attention must be especially drawn to the following important point:

In order that an electron, after having cross the attenuated portion of the circumference, which is bounded by the delay line fingers 15 and 18, may arrive in front of finger 14 under conditions which are favourable for the interaction, it must have a phase sufficiently near that of the interaction beam originating at this place. It is known that the phase angle $\varphi$ between two successive elements of a delay line, the homologous points of which are spaced by a pitch $p$, is given by formula:

$$\psi=\frac{2\pi(L+p)}{\lambda}-(2\mu+1)\pi$$

wherein $\lambda$ is the operating wave length, L the length of the line fingers and $\mu$ the degree of the harmonic considered.

The number of the line elements must therefore satisfy the condition $m\cdot\psi=2\pi\cdot n$, wherein $m$ is the number of elements and $n$ an integer. Moreover, it is necessary that the relation, $m\ \psi=2\pi\cdot n$, be true in a wide tuning range.

Both theory and experiments indicate that this condition is realized if $\psi$ is substantially equal to $\pi$.

Figures 3, 4, 8:
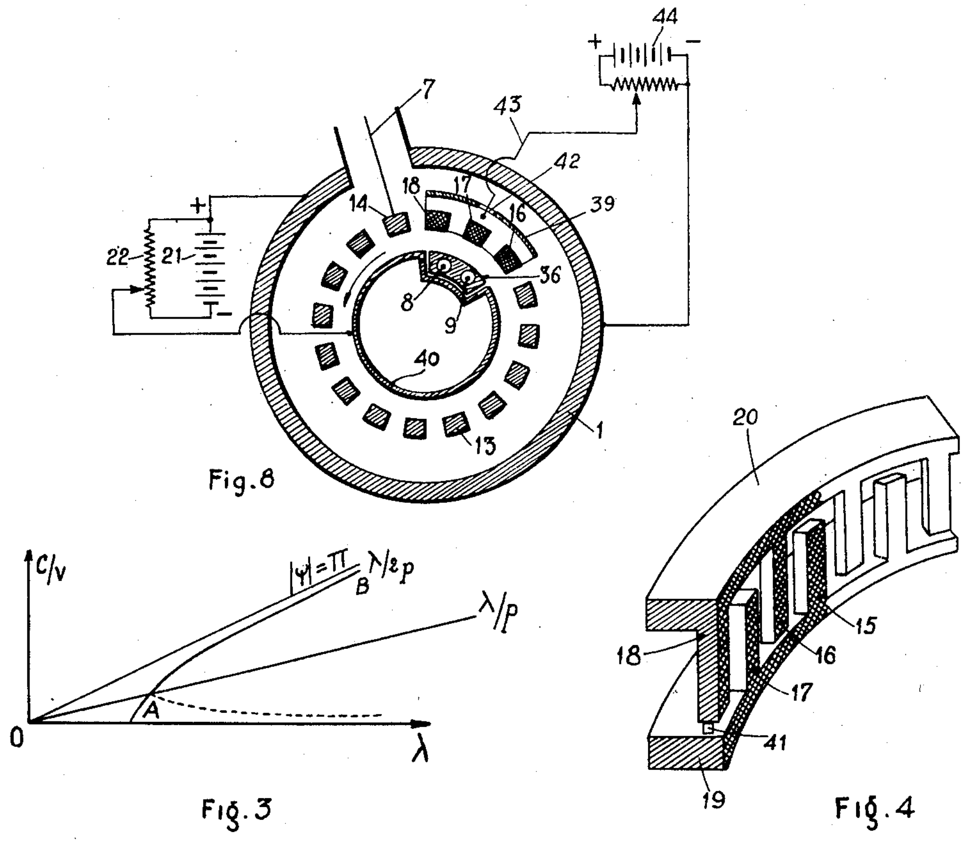
Fig. 3 is an explanatory curve.
Figs. 4, 5 and 6 illustrate various delay lines for use in the tube according to the invention.

This shows that the delay line used must have for the space harmonic for which the tube is intended, a dispersion curve having the shape of the portion A B of the curve represented in Fig. 3.

It is known that the dispersion curve is the curve giving the ratio $c/|v|$, i.e. the ratio of the velocity of light to the phase velocity, as a function of the wave length for various space harmonics. In Fig. 3, the straight line passing through the origin and having a slope $\lambda/2p$ corresponds to a phase angle $|\psi|=\pi$.

The curve in full line is located, in its major portion (portion A B), very close to the straight line $|\psi|=\pi$. In other terms, for this curve, $\psi$ remains constant and close to $\pi$ over a wide frequency band.

Of course $\psi$ is never equal to $\pi$. Hence, it is obvious that in order that the condition $m\cdot\psi=2\pi\cdot n$, should be respected if, $\pi=\psi=\pm\alpha$, it is necessary to have $$m\cdot(\pi\pm\alpha)=2\pi\cdot n$$

This relation theoretically defines the number $m$ of elements of the delay line. It will be noted that preferably only a small portion of the delay line should be coated with the attenuating substance, since the length of the interaction space, and, accordingly the efficiency of the tube, are thereby reduced.

Among the delay lines which may be used in the tube according to the invention, an interdigital line with a remote back-plate must be mentioned, the distance between the back-plate and the line being at least equal to $2p$, $p$ being the pitch of the line.

In relation to the use of an interdigital line, such as the line shown in Fig. 4, the following remark must be made:

It has been already established in the co-pending patent application, Serial Number 275,928, filed March 11, 1952 in the names of Robert Warnecke and Pierre Guenard, now Patent No. 2,888,595, that if $$\frac{\lambda}{4}<L<\frac{\lambda}{2}$$

the fundamental symmetrical, or median, wave is a backward wave. In this case, since, $$\psi=\frac{2\pi(L+p)}{\lambda}=\pi$$

for $$L=\frac{\lambda}{2},\ \psi=0$$

and for $$L=\frac{\lambda}{4}|\psi|=\frac{\pi}{2}$$

It is thus seen that $\psi$ varies considerably as a function of the frequency. Hence, in view of the foregoing, it is obvious that this fundamental symmetrical, or median, wave cannot be used.

It has also been established in the above patent application that, if $$0<L<\frac{\lambda}{4}$$

the first harmonic of the so called anti-symmetrical, or edge, wave is a backward wave.

In this case, if $\lambda$ is large, both with respect to L and to $p$, the expression $$\frac{2\pi(L+p)}{\lambda}$$

is comprised between $\pi/10$ and $\pi/20$ in a wide frequency range. Accordingly, the phase shift $\psi$ between homologous points of two consecutive delay elements of the interdigital line is close to $\pi$ and its difference from $\pi$ is substantially constant over a wide frequency band. This wave may therefore be used for interaction in the tube according to the invention.

As already mentioned, a short circuit is advantageously provided on the last element of the attenuated zone, in the direction of propagation of the beam, i.e., in the example of the interdigital line in Fig. 4, a short-circuit 41 is established between finger 18 of the delay line and base 19 of the opposite comb. This short-circuit contributes to ensure that ultrahigh frequency energy of the delay line propagates only in the direction of the output 7 without propagating along the attenuated portion 18—15.

Fig. 5 diagrammatically represents another delay line which may be used in a tube according to the invention. It is a strongly strapped vane line, the base 25 of which supports radially and inwardly extending vanes 26. Two sets of straps 27 and 28 respectively connect different alternate vanes. As in the above described interdigital line, the output is coupled to one of the vanes of the delay line. A few vanes immediately adjacent that output coupled vane, in the direction of propagation of the beam, are coated with an attenuating material. As in the case of the interdigital line of Fig. 4 a short-circuit 41 is provided along vane 18 between the straps.

Figure 6:
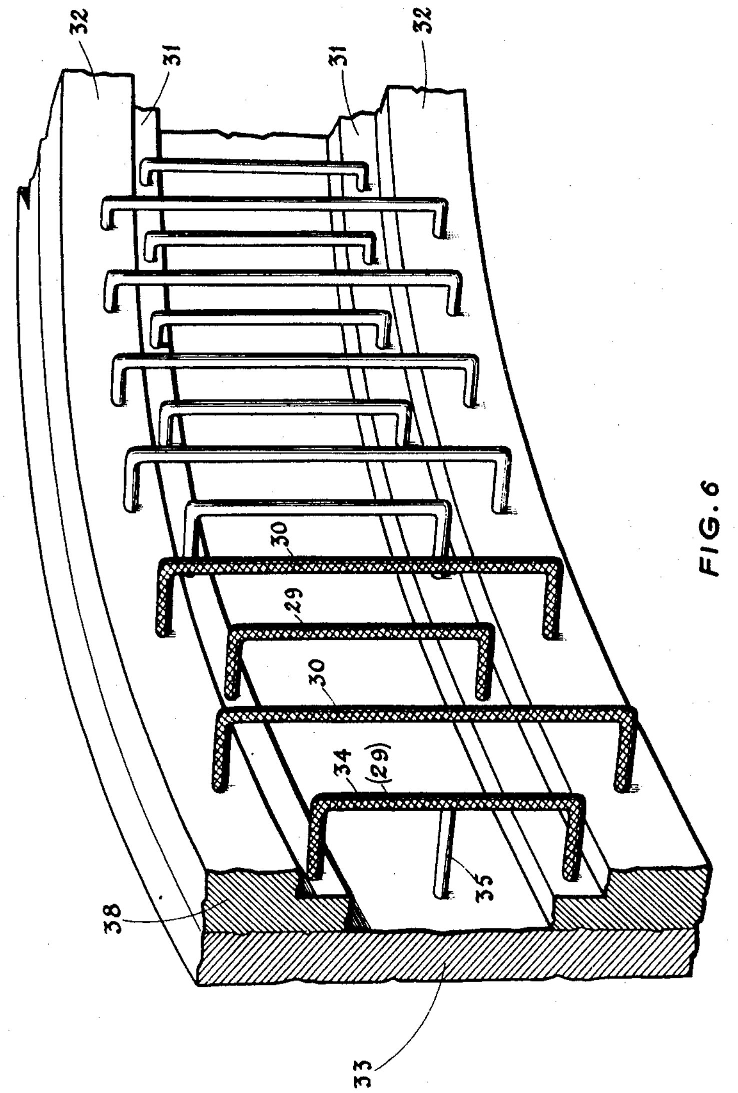

Fig. 6 shows a third example of a delay line for use in the tube according to the invention. It is a modified ladder-type line, more particularly described in the copending application Serial Number 356,050 in the names of Oscar Dohler et al. filed May 19, 1953, for "Ladder type delay line" now Patent No. 2,920,227. This line is, of course, cylindrically shaped, as the lines shown in Figs. 4 and 5.

The line in Fig. 6 comprises shorter rungs 29 and longer rungs 30 having their ends bent at a right angle. The ends of rungs 29 are respectively secured to the lower surface 31 of stepped lateral members 38 of a back plate 33, whereas the rungs 30 are secured to the upper sides 32 of these members 38. The length of the straight portion of two adjacent rungs differs, but the total length of the rungs is nevertheless always substantially equal to $$\frac{\lambda}{2}$$

The dispersion curve of this line for the considered harmonic has the general shape of the curve shown in Fig. 3, as may be seen from curve 2 in Fig. 10 of the last-mentioned copending patent application. As in the cases of Figs. 4 and 5, a short-circuit 35 may be provided between the middle of the attenuated bar 29, which is the closest to the bar to which the output is coupled, and backplate 33 of the line.

While it is generally preferable to have an emissive surface of maximum size, this is not always necessary.

Figure 7:
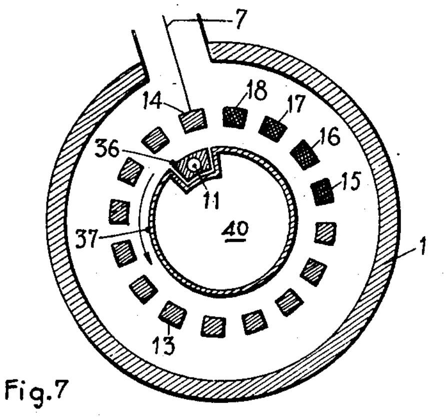
Figs. 7 and 8 show cross-sectional views similar to Fig. 2 of further embodiments of the tube, according to the invention.

Fig. 7 and 8 diagrammatically show modifications of the tube according to the invention in which only a small portion 36 of the central negative electrode or cathode 40 is made emissive. In this case the remainder 37 of the electrode 40 may, in accordance to what is desired, be coated either with a secondary emissive material, or, on the contrary, with an absorbing substance to avoid secondary emission.

As to the adjustment of the frequency of the energy produced, it is performed as described in the above mentioned patent application Ser. No. 281,347. Frequency is a function of the speed $v_0$ of the beam, and the latter is equal to $$\frac{E}{B}$$

where E is the electric field and B the magnetic field prevailing in the interaction space.

In order to adjust $v_0$ and, consequently, the frequency, it suffices to act either on E, or on B, or on both.

However, the following should be noted. It is known that the current flowing around the cathode is proportional to the 3/2—power of the voltage prevailing between the anode and the cathode. In order to maintain constant this current, when varying the operating frequency of the tube by varying the above potential difference E, the portion of the delay line coated with the attenuating substance may be insulated from the remainder of the line and must be positioned in front of the emissive portion of the cylindrical electrode.

The tube of Fig. 8 displays this latter improvement.

A plate 39, made of an insulating material, such as, for instance, mica, is adapted for completely insulating the attenuated portion 16—18 of the delay line, both from the remainder of the delay line and from the cylindrical metal envelope 1 of the tube. An aperture 42 is provided in plate 39 for inserting conductor 43, connected to battery 44, and raising the insulated portion 16—18 of the delay line to the desired voltage with respect to the cathode 36. The frequency of oscillations of the tube may be adjusted without varying this voltage.

The electronic tuning band is thus reduced, but the output collected at 7 remains more constant.

In the embodiments so far described, the delay line 13, which is the anode of the tube, extends over the entire periphery of the cylindrical cathode 10. As already mentioned, this in itself is not necessary, the important feature being that the ends 50 and 51 of what may be called the active portion of delay line 13, i.e. the portion, for example, extending from the left of finger 15 to finger 14 in Fig. 2, must be uncoupled in so far as wave energy propagation is concerned.

In the embodiment so far described this has been done by interconnecting the ends of the active portion of the delay line by an additional delay line portion, comprising fingers 15, 16, 17, 18 which in fact closes the delay line 13 on itself, and by coating these fingers with an absorbing substance.

The same result may be achieved in many other ways which are very diagrammatically shown in Figures 9 to 12.

In the embodiment of Fig. 9 the ends 50 and 51 of delay line 13 are separated by an absorbing block 52.

In the embodiment of Fig. 10 the ends 50 and 51 of the delay line 13 are connected by another delay line portion 53, which renders the anode in fact continuous, as in Fig. 2. To uncouple the ends 50 and 51, an absorber 54 is placed within the electromagnetic field of the delay line portion 53.

In the embodiment of Fig. 11 there is a physical gap in the delay line 13 between the ends 50 and 51 of the anode.

The absorber 55 is located outside the tube which accordingly has two output connections, the connection 7 being used for extracting the output energy and the connection 56 for coupling the anode to absorber 55.

In the embodiment of Figure 12 the gap between the two ends of the active delay line portion is filled in by an inactive delay line portion. However, in this case a short circuit 57 is preferably provided on the delay element immediately following delay element 50 in the direction of propagation of the energy, i.e. in the direction opposite the electron flow direction.

As already mentioned this gap must be sufficiently small not to disturb the static electric field in the electron duct. If the gap is large enough for this to occur, it must be closed by a metal element with attenuation and preferably with a short circuit, as described.

The same short circuit may be advantageously used with all the embodiments shown in Figs. 9 to 12.

By way of example the embodiment of Fig. 12 is shown in more detail in Figs. 13 to 15. The same reference numerals are used in these figures to designate the same elements as in Figs. 1 and 2.

The tube shown in Figs. 13 to 15 is substantially identical to the tube of Figs. 1–2 and will therefore not be described in detail. The magnets and the supply sources have been omitted for the sake of simplicity. The description will be limited to the differences existing between the tube considered here and the tube of Figs. 1 and 2.

It will be readily seen that the general appearance of both tubes is the same. However, in the tube of Figs. 1 and 2 the delay line portion comprised between fingers 15 and 14, to the left of the latter, is covered with an absorbing substance. Further, a single output connection 7 is provided.

The delay line 13 of the tube of Figs. 13 to 15 has no absorbing coating. Instead of that, a second coaxial output connection 56 is provided on finger 15 and an absorber 58, located outside the envelope 1 of the tube, is connected to output 56. Further, a short circuit 57 is provided on the finger immediately following finger 14 in the energy propagation direction, for reasons set forth above.

Fig. 15 shows in more detail the short circuit 57 which is built up by a metal element connecting a finger of the line to the opposite comb 19 and to envelope 1.

In the embodiment shown the absorber 58 (Fig. 13) is in prolongation of the inner conductor 59 of the coaxial output 56. A sleeve 60 is threaded onto the outside conductor 61 of the output 56 and a short circuit 62 is provided between the outer end of sleeve 60 and the absorber 58.

Of course the modification of Fig. 8 is also applicable to the tube just described, in which case the delay line portion 13, or the conductive element closing the gap between the two ends of delay line, must be insulated from the remainder of the line.

The tube according to the invention is simple and rugged. The tuning range is generally less than that of the backward wave oscillator known under the trade name Carcinotron (registered trademark) and described in the above patent application Ser. No. 281,347, but is nevertheless greatly superior to that of the magnetron.

It is of course to be understood that the present invention is not limited to the embodiments represented and described, which have been given only by way of example.

What we claim is:

1. A backward wave oscillator tube of the traveling wave type comprising, in an evacuated envelope, a cathode cylinder, an anode in the form of a delay line spaced from and surrounding said cathode cylinder over an arc somewhat less than 360° to form along said arc an active delay circuit with two ends spaced apart by a small gap, means for causing an electron flow emitted from said cathode to propagate around said cylinder at a velocity substantially equal to the phase velocity of a backward space harmonic of an electromagnetic wave traveling along said delay line to induce and sustain traveling-wave ultra-high-frequency oscillation energy on said delay line, and output means connected to one end of said delay circuit for extracting said energy, said tube including reflection-suppressing means disposed within said gap for mutually uncoupling said two ends and for effectively preventing reflections thereat of said oscillation energy, said reflection-suppressing means being operative to provide in said gap an essentially reflectionless discontinuity for the flow of ultra-high-frequency energy while leaving essentially unaffected the flow of electrons, whereby said flow of electrons propagates in a re-entrant manner around said cathode cylinder.

2. An oscillator tube according to claim 1, wherein said reflection-suppressing means includes an inactive delay line portion disposed within said gap and composed of elements coated with an attenuating material.

3. An oscillator tube according to claim 2, wherein said inactive delay line portion is provided with a short-circuiting member adjacent said output means.

4. An oscillator tube according to claim 2, wherein said cathode cylinder is electron emissive only over a portion of its surface.

5. An oscillator tube according to claim 4, wherein said inactive delay line portion is facing said electron emissive portion of the cathode cylinder and is insulated from said effective delay circuit, and further comprising means for raising said inactive delay line portion to a positive potential with respect to said cathode.

6. An oscillator tube according to claim 1, wherein said reflection-suppressing means comprises at least one conductive element disposed within said gap and coated with an attenuating material.

7. An oscillator tube according to claim 1, wherein said reflection-suppressing means comprises an inactive delay line portion disposed within said gap and an absorber disposed close to said inactive delay line portion.

8. An oscillator tube according to claim 1, wherein said reflection-suppressing means comprises an inactive delay line portion disposed within said gap, said tube further including absorbing means located outside said tube envelope and connected to the other end of said delay circuit.

9. An oscillator tube according to claim 8, wherein said inactive delay line portion is provided with a short-circuiting member adjacent said output means.

10. A backward-wave oscillator tube of the traveling wave type comprising, in an evacuated envelope, a cathode cylinder, an anode in the form of a delay line spaced from and surrounding said cathode cylinder over an arc somewhat less than 360° to form along said arc an active delay circuit with two ends spaced apart by a small gap, means for establishing around said cylinder crossed electrostatic and magnetic fields for propagating an electron flow emitted from said cathode in a re-entrant manner around said cylinder at a velocity substantially equal to the phase velocity of a backward space harmonic of an electromagnetic wave traveling along said delay line to induce and sustain ultra-high-frequency oscillation energy on said delay line, absorbing means located within said gap for stopping therein the flow of ultra-high-frequency energy and preventing reflections thereof thereby enabling propagation of a traveling wave essentially in only one direction along said delay circuit, and output means connected to said delay circuit essentially at the downstream end thereof with respect to the sense of propagation of said wave.

11. A backward-wave oscillator tube of the traveling wave type comprising, in an evacuated envelope, a cathode cylinder, an anode in the form of a delay line spaced from and surrounding said cathode cylinder over an arc somewhat less than 360° to form along said arc an active delay circuit with two ends spaced apart by a small gap, means for establishing around said cylinder crossed electrostatic and magnetic fields for propagating an electron flow emitted from said cathode in a re-entrant manner around said cylinder at a velocity substantially equal to the phase velocity of a backward space harmonic of an electromagnetic wave traveling along said delay line to induce and sustain ultra-high-frequency oscillation energy on said delay line, an inactive delay line portion disposed within said gap and coated with an absorbing material for stopping in said gap the flow of ultra-high-frequency energy and preventing reflections thereof, thereby enabling propagation of a traveling wave essentially in only one direction along said active delay circuit, and output means connected to said active delay circuit essentially at the downstream end thereof with respect to the sense of propagation of said wave.

12. A backward-wave oscillator tube of the traveling wave type comprising, in an evacuated envelope, a cathode cylinder, an anode in the form of a delay line spaced from and surrounding said cathode cylinder over an arc somewhat less than 360° to form along said arc an inactive delay circuit with two ends spaced apart by a small gap, means for establishing around said cylinder crossed electrostatic and magnetic fields for propagating an electron flow emitted from said cathode in a re-entrant manner around said cylinder at a velocity substantially equal to the phase velocity of a backward space harmonic of an electromagnetic wave traveling along said delay line to induce and sustain ultra-high-frequency oscillation energy on said delay line, absorbing means including at least one conductive element disposed within said gap and coated with an attenuating material for stopping in said gap the flow of ultra-high-frequency energy and preventing reflections thereof thereby enabling propagation of a traveling wave essentially in only one direction along said active delay circuit, and output means connected to said active delay circuit essentially at the downstream end thereof with respect to the sense of propagation of said wave.

13. A backward-wave oscillator tube of the traveling wave type comprising, in an evacuated envelope, a cathode cylinder having on its surface an electron emissive portion, an anode in the form of a delay line spaced from and surrounding said cathode cylinder over an arc somewhat less than 360° to form along said arc an active delay circuit with two ends spaced apart by a small gap, means for establishing around said cylinder crossed electrostatic and magnetic fields for propagating an electron flow emitted from said cathode in a re-entrant manner around said cylinder at a velocity substantially equal to the phase velocity of a backward space harmonic of an electromagnetic wave traveling along said delay line to induce and sustain ultra-high-frequency oscillation energy on said delay line, an inactive delay line portion disposed within said gap and insulated from said active delay circuit, said inactive delay line portion being coated with an absorbing material for stopping in said gap the flow of ultra-high-frequency energy and preventing reflections thereof thereby enabling propagation of a traveling wave essentially in only one direction along said active delay circuit, and output means connected to said active delay circuit essentially at the downstream end thereof with respect to the sense of propagation of said wave.

14. A backward wave, traveling-wave type oscillator tube as defined in claim 13, further comprising means for raising said inactive delay line portion to a positive potential with respect to said cathode.

15. A backward wave, traveling-wave type oscillator tube as defined in claim 15, wherein said gas faces said electron emissive portion.

16. An ultra-high-frequency backward-wave oscillator tube of the traveling wave type which may be tuned electronically over a substantially wide band by varying the velocity of the electron flow, comprising, in an evacuated envelope, cathode means constituting an electron source adapted to produce an electron flow, delay line means spaced from said cathode means to provide for said electron flow a re-entrant type interaction space and having effectively two ends, means for propagating said electron flow in said re-entrant interaction space in coupled relationship with said delay line means to induce by the interaction between said electron flow and said delay line means an electromagnetic wave which travels in a direction opposite to said electron flow, reflection-suppressing means between said two ends of said delay line means for effectively preventing standing waves along said delay line means by reflections thereat, and output means coupled to said delay line means near the downstream end thereof with respect to the direction of propagation of said backward traveling wave.

17. An electron discharge device of the backward-wave traveling-wave type oscillator adapted to be electronically tuned over a substantially wide band of frequencies comprising a non-re-entrant slow wave transmission network the ends of which are effectively separated by a gap, a cathode arranged substantially parallel to at least a portion of said network, means for directing a flow of electrons from said cathode adjacent said network in energy-exchanging relation with radio frequency fields existing along said network to induce and sustain by the interaction between said electron flow and said transmission network an electromagnetic backward wave which travels in a direction opposite to the electron flow, reflection-suppressing means in said gap for substantially preventing reflections of electromagnetic waves thereat to thereby essentially eliminate standing waves on said transmission network while leaving said backward wave essentially unaffected, and output means coupled to said transmission network within the upstream region thereof with respect to the direction of said electron flow.

References Cited in the file of this patent

UNITED STATES PATENTS

| | | |
|---|---|---|
| 2,468,243 | Spencer | Apr. 26, 1949 |
| 2,633,505 | Lerbs | Mar. 31, 1953 |
| 2,673,306 | Brown | Mar. 23, 1954 |
| 2,753,481 | Ettenberg | July 3, 1956 |
| 2,760,111 | Kumpfer | Aug. 21, 1956 |
| 2,786,959 | Warnecke et al. | Mar. 26, 1957 |
| 2,808,538 | Cutler | Oct. 1, 1957 |
| 2,828,443 | Dench | Mar. 25, 1958 |
| 2,863,092 | Dench | Dec. 2, 1958 |
| 2,880,355 | Epsztein | Mar. 31, 1959 |
| 2,905,859 | Osepchuk et al. | Sept. 22, 1959 |

FOREIGN PATENTS

| | | |
|---|---|---|
| 1,100,854 | France | Apr. 13, 1955 |